United States Patent
Enomoto et al.

(10) Patent No.: US 10,268,484 B2
(45) Date of Patent: Apr. 23, 2019

(54) REDUNDANT PC SYSTEM

(71) Applicant: Yokogawa Electric Corporation, Tokyo (JP)

(72) Inventors: Hiroya Enomoto, Musashino (JP); Toshiyuki Emori, Musashino (JP); Masanobu Tsuchiya, Musashino (JP); Takeshi Hongo, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 15/071,716

(22) Filed: Mar. 16, 2016

(65) Prior Publication Data
US 2016/0283251 A1 Sep. 29, 2016

(30) Foreign Application Priority Data

Mar. 23, 2015 (JP) ................................ 2015-058850

(51) Int. Cl.
*G06F 11/00* (2006.01)
*G06F 9/4401* (2018.01)
*G06F 11/20* (2006.01)

(52) U.S. Cl.
CPC ........ *G06F 9/4411* (2013.01); *G06F 11/2007* (2013.01); *G06F 11/2033* (2013.01); *G06F 11/2097* (2013.01); *G06F 2201/815* (2013.01)

(58) Field of Classification Search
CPC .. G06F 11/20; G06F 11/2038; G06F 11/2097; G06F 1/2007; G06F 11/2033; G06F 9/4411; G06F 2201/815
See application file for complete search history.

(56) References Cited

U.S. PATENT DOCUMENTS 5,136,498 A * 8/1992 McLaughlin ....... G06F 11/2097
700/3
5,426,774 A * 6/1995 Banerjee .................. G06F 1/14
710/15

(Continued)

FOREIGN PATENT DOCUMENTS

| EP | 2821867 A2 | 1/2015 |
|----|------------|--------|
| GB | 2397661 A | 7/2004 |
| JP | 2001-53757 A | 2/2001 |
| JP | 2001-311692 A | 11/2001 |
| JP | 2013-167922 A | 8/2013 |
| JP | 2014-48933 A | 3/2014 |

OTHER PUBLICATIONS

Kouji Demachi et al., "Vnet/IP Real-time plant network system", Yokogawa Technical Report, Yokogawa Electric Corporation, vol. 49, No. 2, (2005), pp. 37-40 (8 pages total, with translation).

(Continued)

*Primary Examiner* — Jason B Bryan
(74) *Attorney, Agent, or Firm* — Sughrue Mion, PLLC

(57) ABSTRACT

A redundant PC system includes a plurality of redundant PCs which is to be connected through a network. Each of the redundant PCs includes hardware on which an interface for connection to the network is mounted and a host OS configured to operate on the hardware. The host OS is provided with a virtualization unit, and a redundant unit and a real-time communication unit, the redundant unit and the real-time communication unit being configured to operate as separate processes independent of the virtualization unit. The redundant unit is configured to perform a control monitoring for making a PC redundant via a universal interface.

13 Claims, 3 Drawing Sheets

(56) References Cited

U.S. PATENT DOCUMENTS

| | | | |
|---|---|---|---|
| 6,587,970 B1* | 7/2003 | Wang | G06F 11/2025 714/22 |
| 6,920,580 B1* | 7/2005 | Cramer | G06F 11/20 714/24 |
| 2001/0042065 A1 | 11/2001 | Sasaki et al. | |
| 2004/0010731 A1* | 1/2004 | Yu | G06F 11/2005 714/4.12 |
| 2004/0153700 A1* | 8/2004 | Nixon | G05B 9/03 714/4.1 |
| 2008/0133963 A1* | 6/2008 | Katano | G06F 11/0712 714/4.1 |
| 2012/0210198 A1* | 8/2012 | Gale | G06F 11/1679 714/807 |
| 2012/0324183 A1* | 12/2012 | Chiruvolu | G06F 11/2038 711/162 |
| 2013/0253671 A1* | 9/2013 | Torigoe | G05B 19/0421 700/82 |
| 2013/0265894 A1* | 10/2013 | Filsfils | H04L 43/04 370/252 |
| 2016/0062854 A1* | 3/2016 | Allen | H04L 67/1097 714/4.11 |
| 2016/0165463 A1* | 6/2016 | Zhang | H04L 43/10 370/218 |

OTHER PUBLICATIONS

Yadav, et al., INDUS-2 LCW Plant Control System Using Redundant PC at Uppermost Layer, IEEE International Conference on Reliability Safety and Hazard, Dec. 14, 2010, pp. 568-571, XP 031871616.

Communication dated Aug. 25, 2016, issued by the European Patent Office in counterpart European Patent Application No. 16160031.7.

T. Miyoshi et al., "A Consideration about Functional Extension of UNIX Applications and Inter-process Communication", UNIX, Aug. 15, 1991, vol. 32, No. 8, (7 pages total).

Toseto et al. "Plant driving at a turning point—considering a future path and a possibility" The new model synthesis instrumentation system which adapts itself to needs in the next generation-, Instrumentation System, Kogyogizyutsusya Ltd., Sep. 1, 2005, vol. 48 Chapter 9, relevant passages: Fig. 1, (5 pages total).

Edited by Information System and Information Technology Encyclopedia Editorial Committee "Actual Situation of Information System", Government offices public service system, Kabushikikaisyabaihuukan, Mar. 28, 2003, First Edition, pp. 172-173, relevant passages: clause (c) and Fig. 4 in p. 173, (5 pages total).

"Handbook of Control and Information Technology for Manufacturing Plants" Handbook of Control and Information Technology for Manufacturing Plants, Nov. 25, 2004, First Edition, pp. 796-797, relevant passages: (3) and Fig. 5 on pp. 796-797, (5 pages total).

* cited by examiner

REDUNDANT PC SYSTEM

CROSS-REFERENCE TO RELATED APPLICATION

The present application claims priority from Japanese Patent Application No. 2015-058850 filed on Mar. 23, 2015, the entire content of which is incorporated herein by reference.

BACKGROUND

Technical Field

The present disclosure relates to a redundant PC system, and more specifically, to a redundant PC system capable of securing a real-time operability and high reliability necessary for a process control system and the like and coping with a change in a lengthy life cycle of a plant.

Related Art

In a process control system of the related art, a PC group having an operation and monitoring function and the like and a controller are connected to each other through an independent network so as to balance a real-time operability with high reliability.

FIG. 2 depicts a configuration of an example of the process control system of the related art. In FIG. 2, a field device 1 such as a sensor and an actuator is connected to a control network 3 via a controller 2.

A sensor 11 of the field device 1 is configured to measure a physical amount of a measurement target and an actuator 12 is configured to drive an operation target. The controller 2 is distributed and arranged in a plant and has a programmable calculation processing function for exchanging a variety of information with an operation and monitoring terminal unit and transmitting a driving signal to the actuator 12 on the basis of the information from the sensor 11.

A PC 4 is also connected to the control network 3. The PC 4 has a function of providing application software such as a function of providing an operator with a variety of information necessary to control and monitor the entire process control system on the basis of the information from the controller 2, an operation and monitoring function for making appropriate instruction and management to respective system constitutional elements on the basis of the information and a device managing function for managing repair and maintenance conditions and the like of various devices.

The PC 4 is provided with a dedicated Network Interface Card (hereinafter, also referred to as NIC) 41 for connection to the control network 3, an interface NIC IX 42 for NIC and the like, as hardware. In the PC 4, an OS 43, a variety of application software 44 and the like are stored as software.

In the meantime, the control network 3 is connected with a plurality of PCs 4 so as to form a PC group. However, in FIG. 2, only one PC 4 is shown.

FIG. 3 depicts a configuration of another example of the process control system of the related art. In the configuration of FIG. 3, the PC 4 is made redundant by a operating-side PC 4A and a standby-side PC 4B so as to improve the reliability of the system. The operating-side PC 4A and the standby-side PC 4B are connected to the control network 3 via changeover switches SW1, SW2 configured to switch in conjunction with each other, and are connected to each other via a redundancy control communication line RL.

Non-Patent Document 1 discloses a technology relating to 'real-time plant network system Vnet/IP' for process automation based on Ethernet (registered trademark) of 1 Gbps.

According to the Vnet/IP communication disclosed in Non-Patent Document 1, a network of a duplex configuration is adopted so as to secure the high reliability. Thereby, when a failure or an abnormality occurs in one system, a path can be switched automatically and immediately and the real-time operability and the high reliability can be balanced.

Patent Document 1 discloses a technology of providing a redundant communication system capable of reducing a burden on an engineering operation.

[Non-Patent Document 1] Koji Demachi et al., 'Real-time plant network system Vnet/IP', Yokogawa technical report, Yokogawa Electric Corporation, Apr. 20, 2005, Vol. 49, No. 2 (2005), p. 37-40

[Patent Document 1] Japanese Patent Application Publication No. 2013-167922A

The efforts to establish the control network that is to be used for the process control system by the universal Ethernet have been also made. However, the general TCP/IP communication that is used for the Ethernet does not have a real-time operability for guaranteeing the secure implementation of the processing within a defined time period, which is required in the process control system.

In the meantime, a dedicated interface card for Vnet/IP is required so as to perform Vnet/IP communication in a universal PC.

Since each dedicated interface card for Vnet/IP mounted on each PC has a master property of switching the redundant network, it is not possible to provide a plurality of interface cards on the same station address.

Therefore, as disclosed in Patent Document 1, for example, two universal computers for which the same station address is set are prepared, and a line of one interface card is switched with a network switch (Layer 2 switch), so that the redundancy is realized.

For this reason, the connection seems to be temporarily disconnected, as seen from a communication counterpart such as the controller. Also, since the Layer 2 switch for the switching and a power supply thereof are required, the cost increases and the failure rate also increases as the number of components increases.

Also, according to the PC redundancy method shown in FIG. 3, a standby restart method is adopted. Therefore, it takes about 10 seconds to switch the control right of the redundant PCs 4A, 4B, so that a blank period in data acquisition occurs, an operation of the station seems to stop and the real-time operability cannot be maintained.

In the meantime, the product life of the universal computer or the generation changes of a variety of components thereof and the OS such as Windows (registered trademark) are made every few years, so that the cost performance largely increases. On the other hand, the supply of the old-generation product is stopped in many cases.

In the meantime, as shown in FIG. 3, the process control system established by the plurality of connected PCs 4A, 4B is necessarily required to continuously operate over the plant lifetime of about 30 years. The application software such as the operation and monitoring function is required to have the operability and function as usual during the operating time period even when the generation changes of the OS and the like are made, because of the habit and education of the operator, the preservation of the know-how and the like.

Also, as the technology of the universal PC is innovated, the universal I/F of the PC also evolves. As the universal I/F evolves, it is difficult to purchase a universal PC corresponding to the old-generation universal I/F. In order to cope with the new evolved universal I/F, it is necessarily required to again develop a dedicated interface card on many occasions in correspondence to the evolution of the universal I/F of the PC because it is not possible to continuously use the same dedicated interface card during the plant lifetime.

SUMMARY

Exemplary embodiments of the invention provides a redundant PC system capable of securing a real-time operability and high reliability necessary for a process control system and the like and coping with a change in a lengthy life cycle of a plant.

A redundant PC system according to an exemplary embodiment comprises:

a plurality of redundant PCs which is to be connected through a network, each of the redundant PCs comprising hardware on which an interface for connection to the network is mounted and a host OS configured to operate on the hardware, wherein the host OS is provided with a virtualization unit, and a redundant unit and a real-time communication unit, the redundant unit and the real-time communication unit being configured to operate as separate processes independent of the virtualization unit, and wherein the redundant unit is configured to perform a control monitoring for making a PC redundant via a universal interface.

The real-time communication unit may be configured to transmit and receive information between the redundant PCs connected to the network.

The redundant unit and the real-time communication unit may be exclusively allotted with a CPU resource of the hardware, respectively.

A guest OS and application software may be configured to operate on the virtualization unit.

The redundant PC system may configure a plant control system configured to control a plant.

By the above configurations, it is possible to implement the redundant PC system capable of securing the real-time operability and high reliability and coping with the change in the lengthy life cycle of the plant.

DETAILED DESCRIPTION

Figure 1:
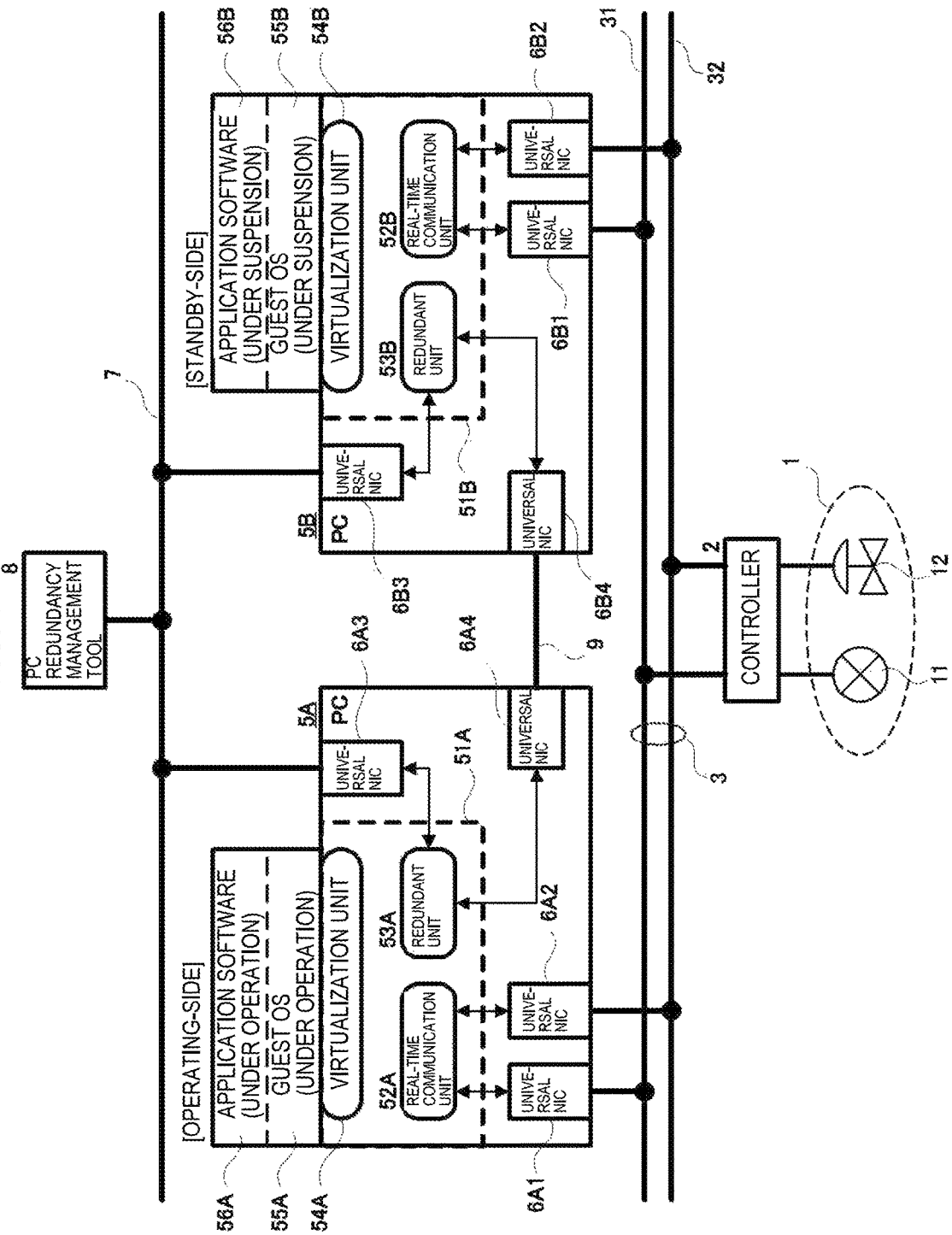
FIG. 1 depicts a configuration of an exemplary embodiment of the present invention.
Figure 2:
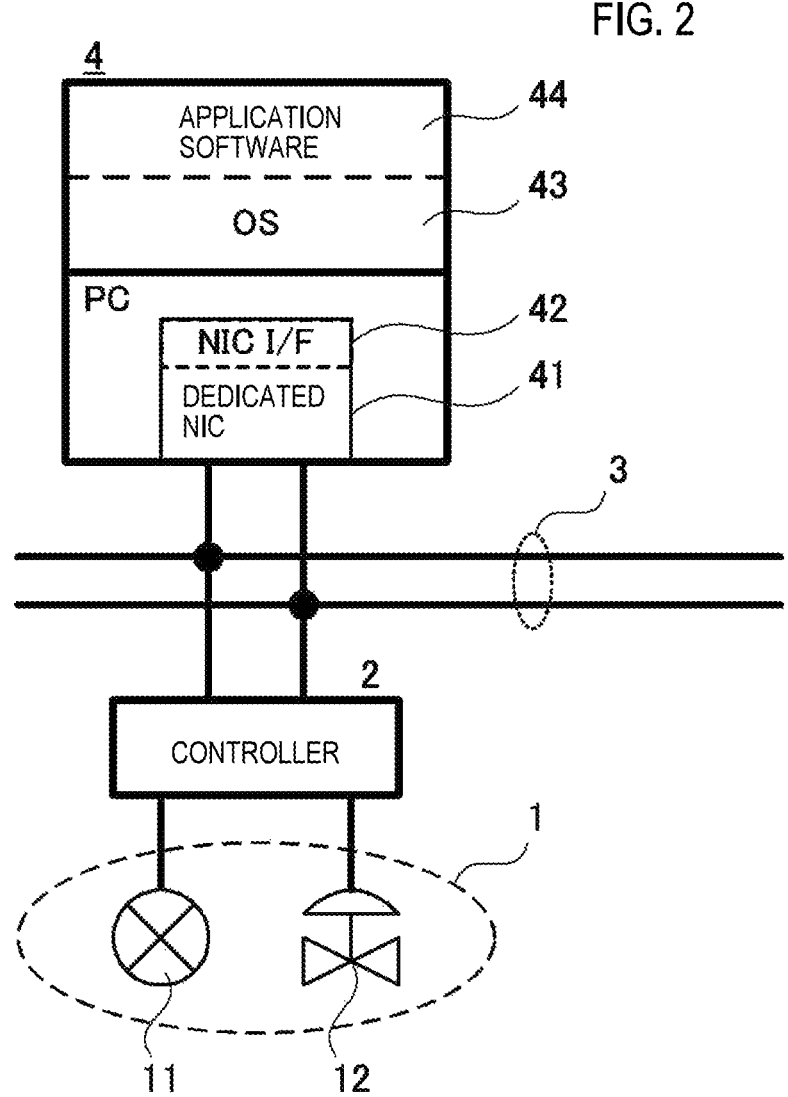
FIG. 2 depicts a configuration of an example of a process control system of the related art.
Figure 3:
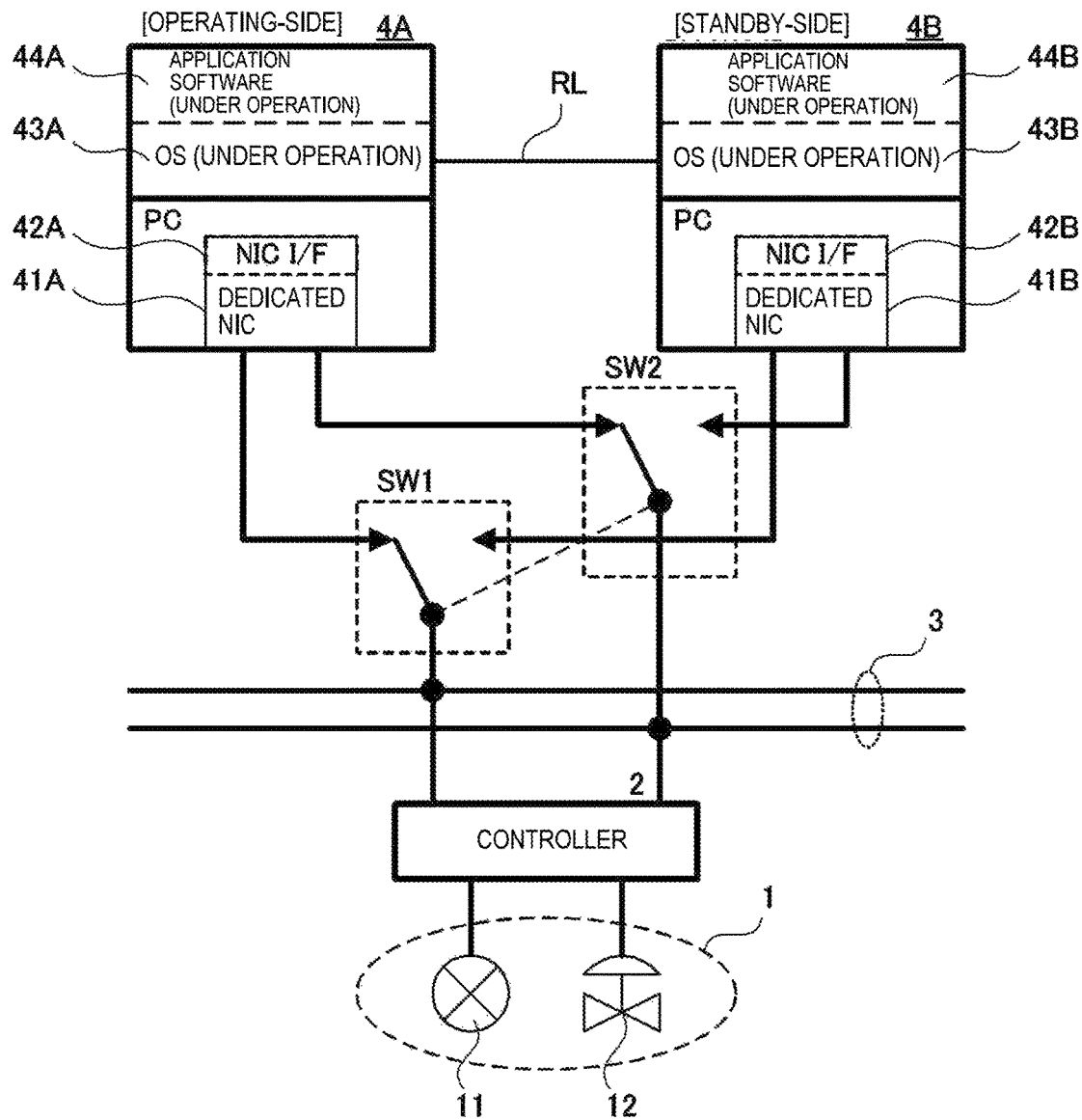
FIG. 3 depicts a configuration of another example of the process control system of the related art.

Hereinafter, an exemplary embodiment of the present invention will be described in detail with reference to the drawings. FIG. 1 depicts a configuration of an exemplary embodiment of the present invention. In FIG. 1, the parts common to FIG. 3 are denoted with the same reference numerals.

In FIG. 1, the hardware such as PCs 5A, 5B, NICs 6A1 to 6A4, 6B1 to 6B4 and the like is universal products that are usually available commercially. That is, for the hardware, the generation changes are assumed every few years.

In contrast, guest OS 55A, 55B and application software 56A, 56B are assumed to be kept as a set, irrespective of the generation changes of the hardware. The reason is that when a change of the guest OS such as generation change of Windows (registered trademark) XP into Windows 8 is made, an update of the application software is also required in many cases.

According to the present invention, host OS 51A, 51B are provided between the hardware (PCs 5A, 5B, NICs 6A1 to 6A4, 6B1 to 6B4 and the like) and the software (guest OS 55A, 55B and application software 56A, 56B and the like). As the host OS 51A, 51B, Linux (registered trademark) and the like may be exemplified.

On the host OS 51A, 51B, real-time communication units 52A, 52B, redundant units 53A, 53B for redundancy of the PCs 5A, 5B, and virtualization units 54A, 54B are mounted as independent processes. The real-time communication units 52A, 52B are configured to perform control real-time communication. The virtualization units 54A, 54B are configured to operate the guest OS 55A, 55B and the application software 56A, 56B.

The real-time communication units 52A, 52B are connected to a control network 31 via the universal NICs 6A1, 6B1 and are connected to a control network 32 via the universal NICs 6A2, 6B2.

The control network 3 configuring the process control system is made redundant in many cases, like the present invention. The real-time communication units 52A, 52B configuring the present invention are configured to connect a plurality of universal NICs. Therefore, for example, when an abnormality is detected, it is possible to switch the control network from a operating-side control network (for example, 31) to a standby-side control network (for example, 32).

Also, according to the present invention, the NICs 6B1, 6B2 for the control network of the standby-side redundant PC 5B are also connected to the redundant control networks 31, 32 all the time. The real-time communication units 52A, 52B have functions of including redundancy counterparts of own stations and periodically transmitting and receiving diagnosis packets between the operating-side/the standby-side of the own station and the operating-side/the standby-side of the other station and checking states and healthiness of the stations.

The redundant unit 53A of the redundant operating-side PC 5A and the redundant unit 53B of the standby-side PC 5B are directly connected via the universal NICs 6A4, 6B4 and an equalizing bus 9 for PC redundancy.

During a usual operation, the guest OS 55A and application software 56A of the operating-side PC 5A continue operations thereof and the guest OS 55B and application software 56B of the standby-side PC 5B stop operations thereof.

The redundant unit 53A of the operating-side PC 5A is configured to transmit information such as snapshot in a memory on a virtual device provided for the virtualization unit 54A to the standby-side PC 5B through the equalizing bus 9, as the equalizing information.

When an abnormality occurs in the operating-side PC 5A, the guest OS 55B and application software 56B of the standby-side PC 5B are started using the equalizing information already transmitted to the virtualization unit 54B of the standby-side PC 5B and the control right is switched to the standby-side PC 5B.

Also, the redundant unit 53A of the operating-side PC 5A has a self-diagnosis function for the own PC 5A, the NICs 6A3, 6A4, the guest OS 55A and the like, and the redundant unit 53B of the standby-side PC 5B has a self-diagnosis function for the own PC 5B, the NICs 6B3, 6B4, the guest OS 55B and the like. Further, the redundant unit 53A of the operating-side PC 5A and the redundant unit 53B of the standby-side PC 5B are configured to check heartbeats each other, thereby checking a state of the redundant counterpart.

When an abnormality is detected, the redundant unit 53A of the operating-side PC 5A and the redundant unit 53B of the standby-side PC 5B switch the control right from the operating-side PC to the standby-side PC (i.e., the redundant unit 53A of the operating-side PC 5A and the redundant unit 53B of the standby-side 5B are switched from operation side PC to standby-side PC), or notify a PC redundancy management tool 8 of abnormality occurrence, for example.

The PC redundancy management tool 8 is management tool configured to operate on an engineering terminal, and is connected to the redundant units 53A, 53B via an information network 7 and the universal NICs 6A3, 6B3.

The PC redundancy management tool 8 has following functions.

1) A function of displaying an operating state of the redundancy and operating states of the various hardware/networks, thereby providing the information upon a maintenance operation.

2) A function for performing a maintenance operation such as control right switching of the PC, start/stop of a system and separation into two PCs.

3) A live update function (an update function as the hardware is operating)

4) A backup/restore function of the guest OS

5) A function for repair and maintenance and management of a system, such as Ping Check.

By the above configuration, the real-time communication units 52A, 52B and the redundant units 53A, 53B, and the virtualization units 54A, 54B are placed on the independent processes on the hosts OS 51A, 51B. Thereby, it is possible to equalize the information, to check the states and to make the switching between the redundant PCs 5A, 5B without being influenced by the states/interrupt situations of the guest OS 55A, 55B/application software 56A, 56B and by the state and situation of the control network 3.

Also, since it is possible to establish the redundant system without depending on the guest OS 55A, 55B and the application software 56A, 56B, it is possible to prevent systems different for each of the applications from being provided.

Also, the operating-side/the standby-side control network ports of the redundant control network 3 and the operating-side/the standby-side control network ports of the redundant PC 5A, 5B are always connected to the redundant control network 3. Therefore, it is possible to check the healthiness of the redundant network 3 and the redundant PCs 5A, 5B in real time by the exchange of the diagnosis packets by the real-time communication unit 52A, 52B.

Therefore, it is possible to quickly detect the abnormality of the redundant PCs 5A, 5B and the abnormality of the redundant network 3, thereby immediately switching the control network from the operating-side to the standby-side.

Also, since the Layer 2 switches SW1, SW2 for switching the PC as shown in FIG. 3 are not required, it is possible to reduce the cost and the number of Fits.

Also, the controller 2, the operation and monitoring terminal (not shown) and the like connected to the guest OS 55A, 55B, the application software 56A, 56B and the control network 3 can continue the operations thereof without being conscious of the switching of the PC and the network.

As a result, the controller 2, the operation and monitoring terminal and the like connected to the guest OS 55A, 55B, the application software 56A, 56B and the control network 3 can be made not to depend on the redundancy configuration.

Also, the real-time communication units 52A, 52B are provided on the host OS 51A, 51B, so that it is possible to use a universal NIC. Thereby, it is possible to enjoy the achievements of the technology innovations of the latest generation of PC and NIC all the time and to solve the problems that an old-generation product, which is highly expensive, should be purchased and an old-generation product cannot be acquired.

The state as to whether the redundant control network 3 or any of the redundant PCs 5A, 5B is operating is perceived and managed by the PC redundancy management tool 8. Therefore, the controller 2, the operation and monitoring terminal and the like connected to the guest OS 55A, 55B, the application software 56A, 56B and the control network 3 can be operated without being conscious of the redundancy method and the like.

That is, it is also possible to continuously use the old generation of the application software/the guest OS/the controller/the operation and monitoring terminal and the like, which are non-redundancy compliant, over the long-term plant life cycle. The application may be a gateway, an engineering tool and the like.

In the meantime, the real-time communication units 52A, 52B and the redundant units 53A, 53B, which are the independent processes, may be exclusively provided with CPU resources of the redundant PCs 5A, 5B, respectively.

Also, in a case of a multicore CPU, an independent CPU core may be allotted to the real-time communication units 52A, 52B and the redundant units 53A, 53B, respectively. Thereby, the respective functions can further independently operate and are difficult to be influenced each other.

Further, the equalizing bus 9 for PC redundancy between the redundant units 53A, 53B of the redundant PCs 5A, 5B may also be made redundant.

As described above, according to the present invention, it is possible to implement the redundant PC system capable of securing the real-time operability and high reliability and coping with the change in the lengthy life cycle of the plant.

What is claimed is:

1. A redundant process control system comprising:
  a plurality of redundant personal computers (PCs) configured to be connected through first and second control networks,
  wherein each of the redundant PCs includes:
    hardware on which a first interface for connection to the first control network, a second interface for connection to the second control network, and a third interface for connection to equalizing bus are mounted, and
    a host operating system (OS) configured to operate on the hardware,
  wherein each host OS includes:
    a virtualization unit configured to operate a guest operating system (OS) and application software,
    a redundant unit configured to transmit equalization information including a snapshot of a memory of a virtual device of the virtualization unit to another redundant PC of the plurality of redundant PCs via the equalizing bus, detect an abnormality in the redundant PC during operation, and, with the redundant unit of the another redundant PC, switch a control right from the redundant PC to the another redundant PC during which the guest OS and the application software of the another redundant PC is started using the equalization information already transmitted to the another redundant PC, based on the detected abnormality, and a real-time communication unit configured to perform real-time communication which guarantees that a certain processing is performed within a defined time period required in the process control system, transmit or receive communication packets in the first control network or the second control network and switch from the first control network to the second control network when an abnormality is detected in the first control network, and wherein in each of the redundant PCs, the redundant unit, the virtualization unit, and the real-time communication unit are configured to operate as separate processes independent of one another.

2. The redundant process control system according to claim 1, wherein in each of the redundant PCs, the redundant unit and the real-time communication unit are exclusively allotted with a central processing unit (CPU) resource of the hardware, respectively.

3. The redundant process control system according to claim 1, wherein the redundant PC system configures a plant control system configured to control a plant.

4. The redundant process control system according to claim 1, wherein the redundant unit is further configured to perform diagnosis of an operation state of the hardware and the third interface of the redundant PC, to transmit a diagnosis packet to the another redundant PC via the equalization bus, and to receive another diagnosis packet from the another redundant PC via the equalization bus.

5. The redundant process control system according to claim 1, wherein the hardware of each redundant PC includes a multicore CPU, and in each of the redundant PCs, the real-time communication unit switching from the first control network to the second control network and the redundant unit switching the control right are allocated to respective CPU cores of the multicore CPU.

6. The redundant process control system according to claim 1, wherein the redundant unit is connected to a redundancy management tool via an information network, wherein the redundancy management tool is configured to switch the control right.

7. The redundant process control system according to claim 1,
wherein each of the first interface, the second interface and the third interface is an universal interface.

8. The redundant process control system according to claim 1, wherein the real-time communication unit is configured to exchange diagnosis packets with the real-time communication unit of the another redundant PC to check if the first control network is abnormal.

9. A communication device including a host operation system (OS) operated on a hardware on which a first network interface, a second network interface, and a third network interface are implemented,
wherein the communication device is connected to a first control network via the first network interface and a second control network via the second network interface, and is connected to an equalization bus via the third network interface, in order to perform redundancy with another communication device,
wherein the host OS includes:
a virtualization unit configured to operate a guest operating system (OS) and application software,
a real-time communication unit configured to perform real-time communication which guarantees a certain processing is performed within a defined time period required in a process control system, transmit or receive communication packets in the first control network or the second control network and switch from the first control network to the second control network when an abnormality is detected in the first network, and
a redundant unit configured to:
transmit equalization information including a snapshot of a memory of a virtual device of the virtualization unit to the another communication device via the equalizing bus,
detect an abnormality in the communication device during operation, and
with a redundant unit of the another control device, switch a control right from the communication device to the another communication device during which a guest OS and application software of a host OS of the another communication device is started using the equalization information already transmitted to the another communication device, based on the detected abnormality, and
wherein the virtualization unit, the real-time communication unit and the redundant unit are configured to operate as separate processes independent of one another.

10. The communication device according to claim 9, wherein
the redundant unit is further configured to perform diagnosis of an operation state of the hardware and the third network interface, to transmit a diagnosis packet to the another communication device via the equalization bus, and to receive another diagnosis packet from the another communication device via the equalization bus.

11. The communication device according to claim 9, wherein
the real-time communication unit is further configured to switch from the first control network to the second control network when an abnormality is detected in the first control network.

12. The communication device according to claim 11, wherein the hardware of the communication device includes a multicore CPU, and wherein the real-time communication unit is configured to switch from the first control network to the second control network when an abnormality is detected in the first control network.

13. The communication device according to claim 9, wherein the communication device configures a plant control system configured to control a plant.

* * * * *